United States Patent [19]

Jameson et al.

[11] Patent Number: 4,679,710
[45] Date of Patent: Jul. 14, 1987

[54] HOT MELT FOAM ADHESIVE SYSTEM

[75] Inventors: Calvin R. Jameson; Dario J. Ramazzotti, both of Atlanta, Ga.

[73] Assignee: Nordson Corporation, Amherst, Ohio

[21] Appl. No.: 276,044

[22] Filed: Jun. 22, 1981

[51] Int. Cl.$^4$ ............................ F01C 1/14; F04C 15/04
[52] U.S. Cl. .............................. 222/190; 222/146.5; 222/318; 137/541; 137/542; 417/250; 418/9; 418/15
[58] Field of Search ............... 222/146 HE, 190, 318; 418/9, 15; 417/250; 261/DIG. 26; 137/541, 542

[56] References Cited

U.S. PATENT DOCUMENTS

| | | | |
|---|---|---|---|
| 1,013,158 | 1/1912 | Hahn | 137/541 |
| 3,965,860 | 6/1976 | Cone et al. | 222/190 X |
| 4,059,714 | 11/1977 | Scholl et al. | 222/146 HE X |
| 4,200,207 | 4/1980 | Akers et al. | 222/190 |

FOREIGN PATENT DOCUMENTS 263149 8/1913 Fed. Rep. of Germany .
831197 2/1952 Fed. Rep. of Germany ...... 137/541

Primary Examiner—Joseph J. Rolla
Assistant Examiner—Frederick R. Handren
Attorney, Agent, or Firm—Wood, Herron & Evans

[57] ABSTRACT

A hot melt foam adhesive system including a gear pump wherein gas is mixed under pressure into the molten adhesive and is driven into solution with the adhesive. The gas is supplied to the pump via a one-way check valve operative to prevent the back flow of molten adhesive to a gas flow control valve, regulator, and gauge. The check valve is positioned above the level of the pump so that molten adhesive cannot flow by gravity into the check valve. The check valve is so constructed that it is biased into a closed position by a spring on the gas side of the valve so that adhesive cannot collect around and foul the spring of the valve.

8 Claims, 5 Drawing Figures

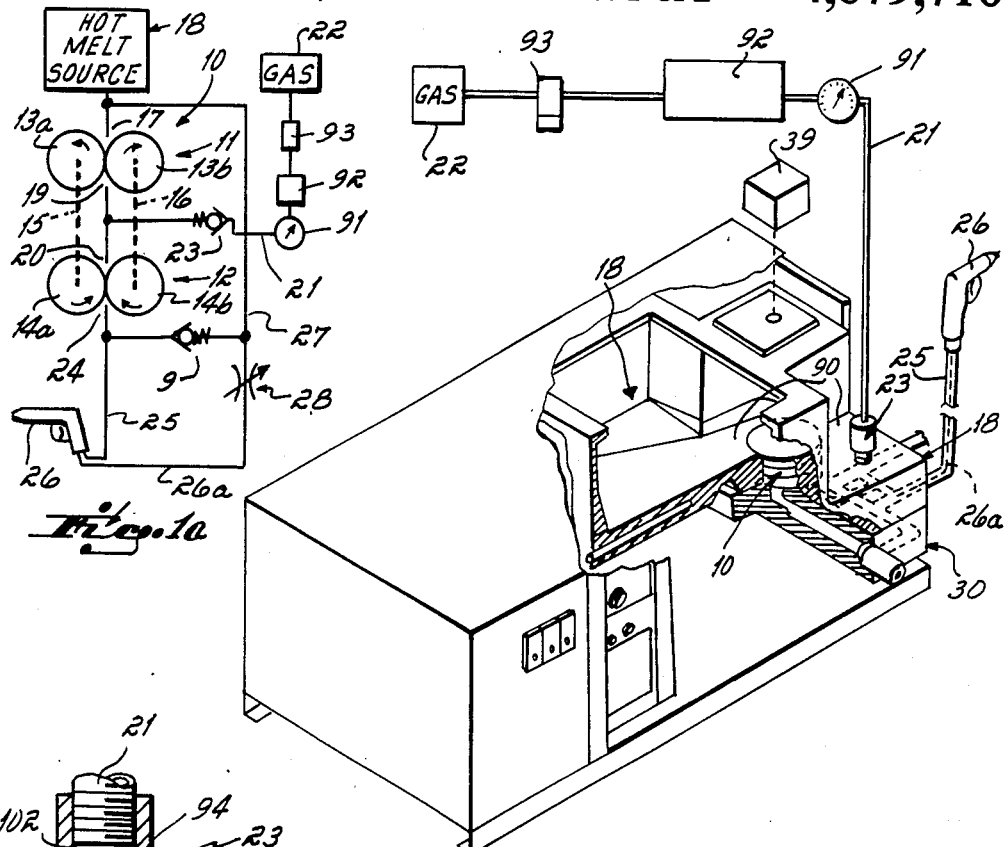
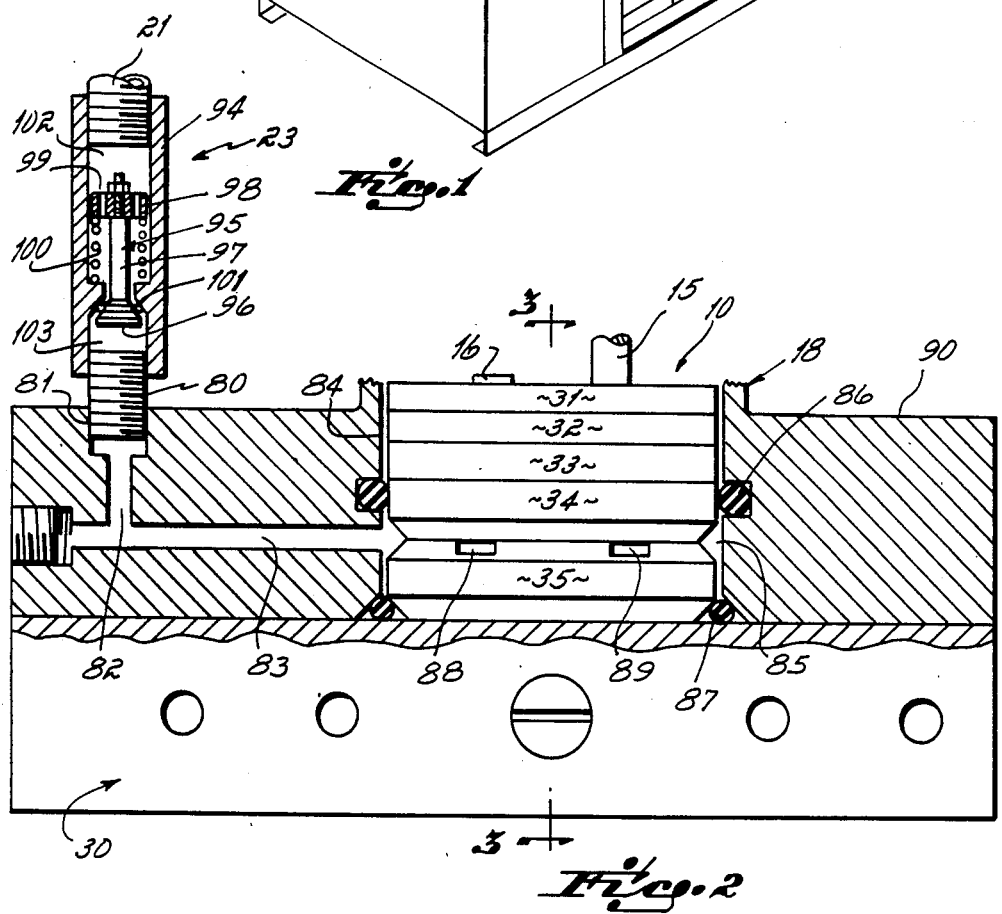

HOT MELT FOAM ADHESIVE SYSTEM

This invention relates to hot melt adhesive foam systems. More particularly, this invention relates to a novel gas supply line and check valve for use in such a system.

Hot melt adhesives are widely used throughout industry for adhering substrates one with another in many diverse applications. One of the most common uses of such adhesives is in the packaging and cartoning industries, where the quick setting time of hot melt adhesives is particularly advantageous. In this end use, a common problem is the difficulty of compressing hot melt adhesive after application so as to obtain sufficient "squeeze out" of the adhesive between the substrates, to achieve a good bond of adequate surface area. The relatively high viscosity, high surface tension, and quick setting time of many hot melt adhesives tend to restrain liquid adhesive from spreading over as large a substrate surface area as is desirable. Instead of spreading, the deposited liquid sets up as a thick bead on the structure. Even when quickly compressed, as for example between two flaps of a carton, the adhesive is difficult to spread. When two adhered surfaces are pulled apart, it is generally found that it is the substrate which fails, rather than the adhesive to substrate interface. Consequently, the greater the area of interface or surface contact between the adhesive and the substrate, the stronger the bond will be.

It has recently been discovered that the adhesive strength of a bond achieved with a given quantity of a selected hot melt adhesive may be appreciably improved, and in most instances at least doubled, if the adhesive is applied as a cellular foam rather than in the conventional way as a non-foamed adhesive. The increased bonding strength of the foamed adhesive results at least in part from the fact that the adhesive foam may be spread over at least twice the area, under the same compressive conditions, as an equal mass of adhesive which has not been foamed. Hot melt adhesive foam also has been found to have a longer "open" time, after it has been deposited onto a first substrate and during which it can effectively bond to a second substrate when pressed against it, yet it has a shorter "tack time" i.e., it will set up and adhere faster after it has been compressed between two substrates. These characteristics together are particularly desirable in cartoning applications. There is no need to close flaps immediately after applying foamed adhesive onto one of the flaps. Also, "pop opening" is very substantially reduced, and the adhered surfaces may be released from clamping pressure soon after application of that pressure. These discoveries are disclosed in Scholl et al U.S. Pat. No. 4,059,714, issued Nov. 22, 1977, entitled "Hot Melt Thermoplastic Adhesive Foam System", and in Scholl et al U.S. Pat. No. 4,059,466, also issued Nov. 22, 1977, entitled "Hot Melt Thermoplastic Adhesive Foam System", both of which are assigned to the assignee of this application.

As shown in those patents, in producing a hot melt adhesive foam, if a gas such as air or nitrogen is thoroughly mixed with liquid hot melt adhesive, the gas can go into solution in the adhesive. When the adhesive/gas solution is subsequently dispensed, as from a conventional valved type of adhesive dispenser or gun, the gas will come out of solution but remains entrapped in the adhesive, to form a closed cell hot melt adhesive foam having the desirable adhesive characteristics described above.

In one preferred embodiment of such a system described in Akers, et al U.S. Pat. No. 4,200,207, and assigned to the assignee of this application, solid thermoplastic adhesive material is heated and melted in a reservoir and the molten adhesive is introduced into a two stage gear pump. Within the gear pump the gas and liquid adhesive are mixed, and the gas is forced into solution with the molten liquid adhesive. The liquid/gas adhesive solution, under pump outlet pressure, is then supplied to a valved type of adhesive dispenser from which the adhesive can selectively be dispensed at atmospheric pressure. Upon emerging from the outlet nozzle of the dispenser, the gas evolves from the solution in the form of small bubbles causing the adhesive to expand volumetrically to form a hot melt adhesive foam. The resultant adhesive foam, if left in an uncompressed state, would set up as a homogeneous foam having air or gas cells evenly distributed throughout, and it has the desired adhesive characteristics mentioned above.

We have found that the system disclosed in the above identified U.S. Pat. No. 4,200,207 is subject to frequent repairs and extended down-time resulting from clogging of a check valve located in the gas supply line to the system. That check valve is located between the pump and a manifold block through which adhesive is circulated to a dispensing gun of the system. Heretofore, this check valve has been located in the manifold block beneath the pump. In that location though, molten adhesive tends to flow by gravity into the check valve and when the system cools, to there solidify and clog the valve. Additionally, in that system the valve is spring biased closed by a compression spring located on the adhesive side of the check valve so that any adhesive which reaches the check valve often causes failure of the spring. The location of the check valve beneath the pump of the system resulted in an extended period of down-time whenever the valve failed because the pump was required to be removed to effect repair of the check valve.

Accordingly, it has been an objective of this invention to provide an improved hot melt adhesive foam system in which failure of the gas supply line check valve occurs much less frequently than has heretofore been the case and in which failure, when it does occur, can be corrected more quickly than has heretofore been possible.

In accordance with this objection, the hot melt foam adhesive system of this invention comprises a two stage pump to which gas is supplied via a check valve located proximate the pump. The check valve though is mounted on the reservoir block of the system in an easily accessible position. The valve is spring biased closed and the spring of the valve is located on the gas side, as opposed to the molten adhesive side, of the valve so that molten adhesive, if it does reach the valve, does not contaminate the spring of the valve.

The advantage of this check valve location and construction is that the valve is not easily contaminated and clogged by molten adhesive flow into the valve and even if adhesive does reach the valve, it does not reach the spring of the valve and therefore is less subject to fouling the valve.

These and other objects and advantages of this invention will be more readily apparent from the following description of the drawings in which:

FIG. 1 is a partially diagrammatic illustration, partially broken away, of a hot melt foam adhesive system incorporating the invention of this application.

FIG. 1a is a diagrammatic illustration of the system of FIG. 1.

FIG. 2 is a side elevational view, partially broken away, of the pump section of the system of FIG. 1.

Figure 3:
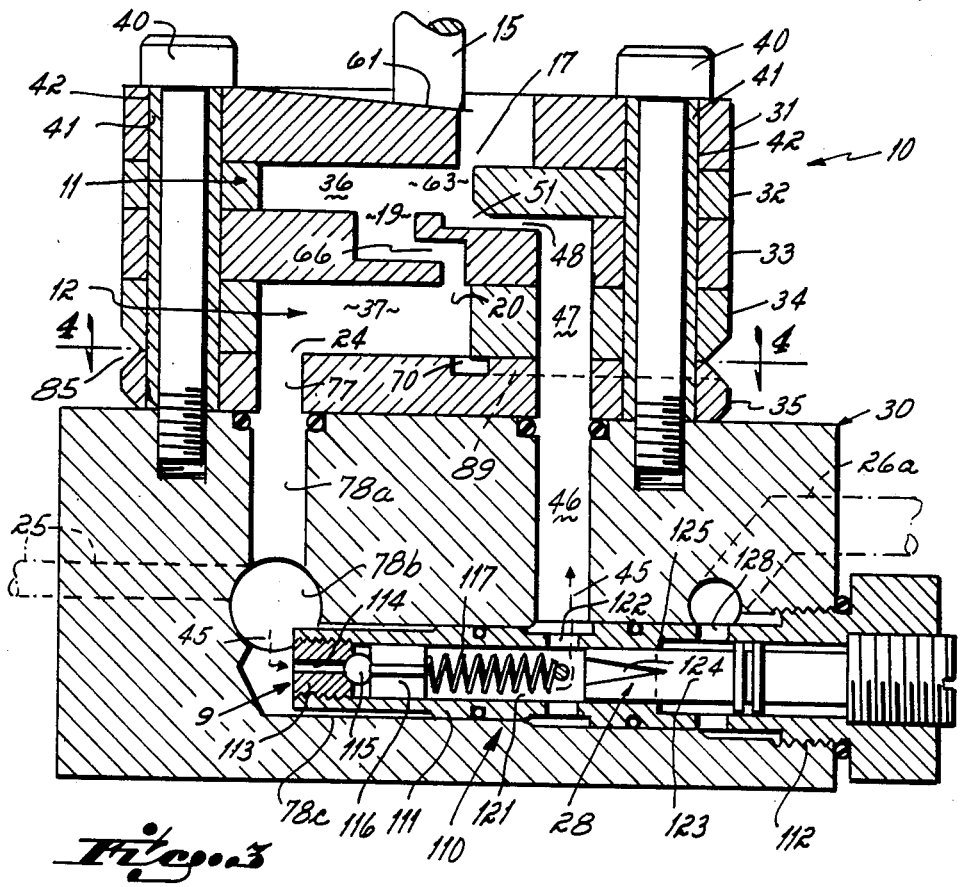
FIG. 3 is a cross sectional view taken on line 3—3 of FIG. 2.

With reference to FIGS. 1 and 1a, the improved system of this invention includes a two-stage gear pump 10 having a first stage 11 and a second stage 12, each stage comprising oppositely rotating and meshed gear pairs 13a and b, and 14a and b respectively. The driven gears 13a, 14a of each stage are connected by a common drive shaft 15, and the idler gears 13b, 14b of each stage are connected by common idler shaft 16. Molten hot melt adhesive is introduced, for example at atmospheric pressure, into low pressure side 17 of the first stage pump 11 from a reservoir 18. The adhesive is delivered at the outlet side 19 of first pump 11 at a metered rate, and from there is introduced into inlet side 20 of the second stage pump. A gas, e.g., air, nitrogen or carbon dioxide, is also introduced into inlet 20 of second stage pump 12, through a gas line 21 from a gas source 22 which may for example be at a pressure in the range of about 1-45 psi. Gas inlet line 21 includes a check valve 23 that prevents back flow of molten adhesive from the first stage pump's outlet side 19 through that line 21 toward the gas source 22.

The gas and molten adhesive are intimately admixed in second stage pump 12, which places them under such pressure that the gas goes into solution with the molten adhesive, thereby providing the molten adhesive/gas solution previously discussed. This solution is ejected from the outlet side 24 of second stage pump 12 through a line 25 to a valved adhesive dispenser 26, e.g., a gun or the like. One valved dispenser structure which may be used with the pump of this invention is illustrated in U.S. Pat. No. 4,059,714, previously referred to. A recycle line 27 is provided between the outlet side 24 of second stage pump 12 and the inlet side 17 of first stage pump 11. This recycle line includes a relief valve 9 therein, for recycling a part or all of the adhesive/gas solution if the system pressure exceeds the relief setting of valve 9. A variable restrictor 28 in the return hose or line 26a from dispenser 26 restricts the recycle flow during cycling of a gun.

In effect, first stage pump 11 meters and delivers molten hot melt adhesive to the inlet side 20 of second stage pump 12. It stabilizes the second stage against viscosity changes and motor speed changes. The second stage pump 12 functions as a mixing device for intimately admixing and pressurizing into solution the metered molten hot melt adhesive from first stage pump 11 with the gas infeed from source 22. It has been found that the combination of a first stage metering pump 11 with the second stage mixing pump 12 provides a more uniform adhesive/gas solution output, and that this in turn enhances the reliability and continuity of the adhesive foam output from the valved dispenser 26. In other words, this pump 10 structure improves the mixing of the adhesive and gas and insures that the foam dispensed will be very uniform and virtually free from spitting and sputtering.

Figure 4:
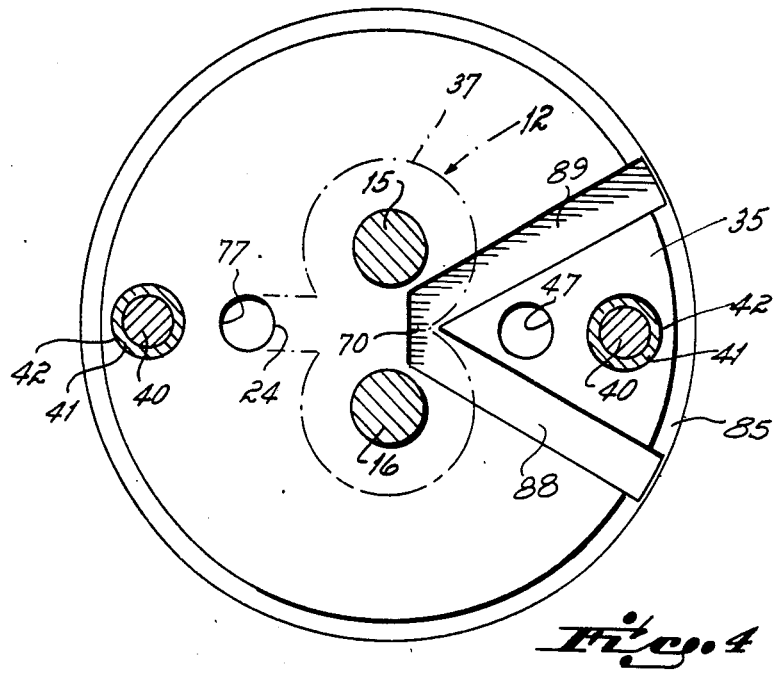
FIG. 4 is a cross sectional view taken on line 4—4 of FIG. 3.

More particularly, and with specific reference to FIGS. 3 and 4, the adhesive foam pump 10 includes a series of specially configured plates stacked on top of, and connected to, a manifold block 30. As shown in FIGS. 2 and 3 the pump 10 includes an inlet end plate 31, a first stage pump plate 32, a center port plate 33, a second stage pump plate 34, and an outlet end plate 35, all of generally the same peripheral configuration and size, and all stacked one on top of the other.

First stage pump plate 32 defines a pair of partially overlapping circular gear cavities 36, which receive a first pair of meshed gears 13a, 13b. The second stage or mixing pump plate 34 defines a second pair of partially overlapping gear cavities 37 which receive a second pair of meshed gears 14a, 14b. The second stage pump 12 has a displacement greater than that of the first stage because the gears of the second stage have a greater thickness than the gears of the first stage. The volume of gas delivered to the second stage from source 22 fills the additional displacement volume of the second stage, i.e., the volume which is in excess of the volume of hot melt received therein.

One gear 13a, 14a of each stage is a drive gear, and the other gear 13b, 14b is an idler gear. The drive gears are connected by shaft 15, which has a connector end for coupling to a drive motor 39.

The pump's plates 31-35 are retained in aligned stacked relation by four bolts (not shown) received therethrough and into threaded bores in the inlet end plate 31, the heads of those bolts being received in seats provided in the end plate 35. Throughbolts 40 pass through positioner sleeve 41 in plate bores 42, and are threaded into tapped bores in the manifold block 30 to mount the preassembled plates 31-35 to the manifold block.

As shown in FIGS. 3 and 4, the inlet port plate 31 provides a first stage hot melt inlet port 17 therethrough, that inlet port cooperating with an angled infeed throat 61 defined in the top surface of that port plate. Inlet port 17 opens into first stage hot melt inlet zone 63, where the gears come out of mesh. The first stage pump plate 32 also includes a first stage outlet zone 19 from which the metered molten hot melt adhesive is directed into intermediate transfer port structure 66 defined in the center port plate 33. The intermediate transfer port structure directs metered molten adhesive from outlet side 19 of first stage pump 11 to inlet side 20 of second stage pump 12. This intermediate transfer port structure includes first stage hot melt outlet port 19, first to second stage transfer bore 66, and second stage hot melt in port 20, all defined in center port plate 33. The metered molten adhesive from first stage pump 11 is thereby introduced into second stage pump 12 from the top side thereof. The second stage pump plate 34 further defines the second stage hot melt "in" zone 20 and the second stage "out" zone 24. The molten adhesive/gas solution exits via outlet 24 of the second stage pump 12. The outlet port 24 cooperates with an outlet throughbore 77 in outlet end plate 35, and that outlet throughbore 77 connects the second stage outlet port 24 with discharge bore 78a in the manifold block 30. The discharge bore section 78a in the manifold block is connected via bore 78b and line 25 with the valved adhesive dispenser 26.

A gas is introduced into inlet side 20 of second stage pump 12 from the bottom side thereof through gas inlet zone 70, see FIG. 4. The gas is directed to this gas inlet zone 70 through check valve 23.

With reference to FIG. 2 it will be seen that the check valve 23 is attached to the top side of the reservoir 18 via a conventional threaded fitting 80. This fitting is threaded into a threaded section 81 of a counterbored vertical passage 82 which connects with a passage 83 leading to a bore 84 of the reservoir 18 within which the pump 10 is mounted. The exterior of the pump 10 is provided with a peripheral groove 85 located at the interface between the plates 34, 35 of the pump. This groove 85 communicates with the passage 83 such that gas flowing through the check valve 23 and passages 82, 83 enters the annular groove 85 around the exterior of the pump. This groove is sealed by a pair of O-rings 86, 87 located above and beneath the annular groove 85. Both of these O-rings contact the exterior surface of the pump and the surface of the bore within which the pump is mounted so as to seal the annular groove 85 against the escape of gas from the channel 85.

With reference now to FIGS. 2, 3 and 4 it will be seen that there is a pair of converging grooves 88, 89 in the top surface of the plate 35 which interconnect the annular groove 85 with the gas inlet zone 70 of the pump through which gas is introduced into the second stage 12 of the pump. Consequently, gas supplied to the check valve 23 flows via the check valve, the passages 82, 83, the annular groove 85, and the channels 88, 89 to the inlet zone 70.

The check valve 23 is mounted above the level of the bottom surface 90 of the reservoir 18 and above the level of the pump 10. This check valve 23 is a conventional commercially available check valve operative to prevent the back flow of hot melt adhesive from the pump to the gas flow controls including the gas flow control gauge 91, pressure regulator 92, and a solenoid control valve 93, all of which are in the gas flow control line 21 between the gas source 22 and the check valve 23.

The check valve 23 is a poppet style of valve comprising a cylinder 94 and a poppet 95. The poppet has a poppet head 96 connected by a stem 97 to a stop 98 bolted onto the end of the stem 97. The stop 98 is ported as illustrated at 99 so as to permit the flow of gas past the stop. Internally of the cylinder 94 of the valve there is a compression spring 100 operative to pull the poppet head 96 of the valve into sealing contact with a valve seat 101. Preferably there is an O-ring mounted in the poppet head and sealingly engageable with the seat 101 to maintain a gas tight seal between the upstream side 102 of the valve and the downstream side 103. When the solenoid valve 93 in the line 21 is opened, gas under pressure is operative to act upon the poppet 95 of the valve and force the valve open so as to permit the flow of gas through the relief valve to the inlet zone 70 of the pump.

It is important to note that the check valve 23 is mounted above the level of the pump 10 such that adhesive cannot flow by gravity into the check valve. It is also important to note that the check valve is pulled into a closed position as a consequence of the spring 100 being located on the upstream gas side 102 rather than the downstream liquid side 103 of the poppet head 96. As a result of this location of the spring, any adhesive which does enter the valve does not come into contact with the spring 100 and therefore cannot clog or foul the spring.

As seen in FIG. 3, the primary flow path, through the pump, of molten hot melt adhesive and of molten adhesive/gas solution once that solution is admixed in the second stage pump 12 is through bore 78a and bore/hose 25 in the manifold block 30 which in use is connected to a gun. However, a recycle flow path is also provided by which a portion of all of the molten adhesive/gas solution can be recycled back through the pump 10 from the gun, into the first stage pump's inlet side 17, as illustrated by dotted arrow 45 in FIG. 3. (This dotted path 45 corresponds to the recycle path 26a, 28 and 27 in FIG. 1a). For this purpose, recycle passages are provided in center port plate 33, second stage pump plate 34, outlet end plate 35 and manifold block 30. As shown in FIG. 3, this recycle porting includes the bore 78a, bore 78c (having relief valve 9 described below therein), a vertical bore 46, a bore 47 through the plates 35, 34, 33 and a lateral passage 48 defined between first stage pump plate 32 and center port plate 33. The recycle boring 46 and 48 connects with inlet side 17 of first stage pump 11, from the bottom surface of first stage pump plate 32 at a recycle inlet port 51, for introducing recycle flow of molten adhesive/gas solution from outlet 24 of second stage pump 12 into hot melt inlet zone 63 while feed molten adhesive (not shown) is added to the recirculated material in zone 63.

The present relief valve indicated at 9 in FIGS. 1a and 3 may be incorporated as part of circulation valve structure designated generally at 110 in FIG. 3 which is received in bore 78c of manifold 30. This relief valve structure includes an outer sleeve 111 which is threaded into bore 78c and 112. A relief valve seat 113 is secured at the inner end of sleeve 111. Seat 113 has an axial port 114 on which is seated a ball 115. Ball 115 is biased against port 114 by a cruciform shaped guide 116 acted upon by a spring 117. Ball 115 is thereby biased toward its seat 114 to form the relief valve 9.

Sleeve 111 is sealed with respect to bore 78c by O-rings. An internal chamber 121 inside sleeve 111 opens through the sleeve wall via radial ports 122 into communication with recycle bore 46 of the manifold. In the event of excessive pressure build-up within the hoses or the dispenser, a high pressure condition will exist on bore 78b. This condition will be relieved by opening of the relief valve 9 so that fluid can flow through bore 114, the interior 121 of sleeve 111, and radial ports 122 to recycle bore 46.

As indicated diagrammatically in FIG. 1a return line 26a from valved dispenser 26 includes a variable restrictor 28. Preferably, as shown in FIG. 3, this variable restrictor 28 is also included as part of the circulation valve structure 110. More specifically, an adjustable valve member 123 is axially positionable in the interior of sleeve 111 to the right of ports 122. Valve member 123 presents a notch or groove 124 at its inner end, this groove having a V-shape as seen in section which forms a valve with a shoulder 125 in sleeve 111. Notch 124 can be positioned axially with respect to shoulder 125 by threading valve member 123 into or out of the sleeve, to control the area of the valve opening. A lock nut, not shown, is provided to secure the member 123 with respect to sleeve 111.

Manifold block 30 includes gun return passage 26a (shown diagrammatically in FIG. 1a). This passage communicates with shoulder 125, through radial ports 128 in sleeve 111. Together, notch 124 and shoulder 125 form the variable restrictor 28 in the hose return line 26a which communicates through ports 122 with recycle bore 46. The axial position of valve member 123 with respect to shoulder 125 thus controls the proportion of flow that will be recycled.

The pump 10 and the hot melt adhesive foam system within which it is employed, is the subject of the above identified U.S. Pat. No. 4,200,207. That patent is hereby incorporated by reference for a more complete description of the pump 10 and the adhesive foam system. The invention of the application resides in the relocation of check valve 23 and in the change of configuration of the check valve in the system.

In use, when pump 10 is operating molten hot melt adhesive is introduced through port 17 in inlet port plate 31 into first stage pump 11. The hot melt adhesive entering the first stage pump may be at ambient pressure. The molten adhesive infeed is metered by the first stage pump and transferred from outlet 19 through port 66 to inlet 20 of second stage pump 12. The gas from the source 22 is supplied via valve 93, pressure regulator 92 and pressure gauge 91 and valve 23 to the gas inlet zone 70 from which it is introduced into second stage pump 12 just after introduction of the metered molten adhesive from first stage pump 11. The pressure at which the gas is introduced will control the density of the foam; pressures in the range of approximately 1-45 psig have already been used. The second stage pump 12 mixes the adhesive and gas to provide, under pressure, a molten adhesive/gas solution which is exhausted from the outlet side 24 of the second stage pump, into the discharge bore 78a of manifold block 30. When valved dispenser 26 is discharging adhesive, relief valve 9 restricts recycle flow of the solution. When the valved dispenser is closed, no adhesive foam is being dispensed, the pressurized adhesive/gas solution recycles through valve 9, sleeve interior 121, recycle bore 46 in the manifold block 30, through recycle bore 47 of outlet end plate 35, second stage pump plate 34, and center port plate 33, back to inlet side 17 of the first stage pump 11.

The primary advantage of this hot melt adhesive foam system relative to the system disclosed in U.S. Pat. No. 4,200,207 upon which it is an improvement is that it requires much less maintenance and down-time than prior art systems. This improvement derives in part from the location and attitude of the check valve 23 which utilizes gravity as an aid in selfcleaning of the valve, thus prolonging the intervals between servicing and cleaning of the valve. Furthermore, the check valve is located in a position on the reservoir where it is easily and quickly accessible when servicing is required. And additionally, the check valve is so constructed that the biasing spring does not come into contact with the molten adhesive and is therefore less subject to becoming fouled than prior art systems in which the spring was located in the adhesive side of the valve.

Throughout this specification and claims, the term "solution" has been used to describe the molten liquid adhesive/gas dispersion supplied under high pressure which, when dispensed from a dispenser at atmospheric pressure, will provide a foamed adhesive. It is believed this mixture is a true solution in which the gas is molecularly dispersed in the liquid adhesive. However, as used in the specification and the claims hereof, the term is intended to encompass the broader concept of a gas homogeneously mixed with a molten liquid adhesive or sealant material whether or not the gas is in fact molecularly dispersed. Further, throughout this specification and claims the phrase "hot melt adhesive" has been used as meaning a solvent-free material which is applied in a molten state.

Having described in detail the preferred embodiment of the invention, what is desired to be claimed and protected by Letters Patent is:

1. Apparatus for dispensing a foamed adhesive or sealant material, said apparatus comprising,
   a pump,
   means for supplying said material in a liquid state to said pump;
   a source of gas,
   means for supplying gas from said source to said pump such that said pump is operable to agitate said liquid material in the presence of the gas so as to distribute said gas throughout said liquid material and to pressurize said liquid material and gas to place said gas into solution with the liquid material, and
   means for dispensing said liquid material and gas solution at a pressure below the solution maintenance pressure of said gas and liquid material solution whereby the gas is released from solution as said liquid forms a form,
   said means for supplying gas to the pump including a check valve for preventing the back flow of liquid material from said pump to the source of said gas, and said check valve being located above the horizontal plane of said pump such that liquid material cannot flow by gravity from said pump into said check valve.

2. The apparatus of claim 1 wherein said check valve includes a closure and a spring for biasing said check valve closure to a closed position, said spring being located on the upstream side of the closure of said check valve whereby said spring does not come into contact with liquid material flowing to said check valve.

3. The foamed adhesive dispensing system of claim 1 in which said check valve includes a closure element, a valve seat, and a spring, said closure element being biased by said spring into engagement with said seat, and said closure element being on the side of said valve seat opposite from said spring.

4. The apparatus of claim 1 wherein said pump means is a two stage gear pump, and said gas supply means being operable to supply said gas to the second stage of said pump.

5. A foamed adhesive dispensing system comprising
   a two stage gear pump having first and second gear stages, each of said gear stages having an inlet and an outlet,
   a passage for supplying liquid adhesive to the inlet of said first stage,
   means for delivering said liquid from the outlet of said first stage to the inlet of said second stage,
   a source of gas,
   means for supplying gas from said source of gas to said second stage for mixing therein with said liquid,
   means for delivering said mixture of gas and liquid from said second stage to a dispenser,
   check valve means within said gas supply means for preventing the flow of liquid adhesive from said pump to said gas source, said check valve means being located above the horizontal plane of said second stage of said pump so that liquid adhesive cannot flow by gravity from said second stage to said check valve.

6. The dispensing system of claim 5 in which said gas supply means includes a flow control valve and a pressure regulator located between said source of gas and said check valve, said check valve being operative to prevent liquid adhesive from flowing from said pump into said flow control valve and pressure regulator.

7. The foamed adhesive dispensing system of claim 5 in which said check valve includes a spring for biasing said check valve to a closed position, said check valve spring being located on the upstream gas supply side of said check valve such that said spring is not contacted by liquid adhesive flowing into said check valve.

8. The foamed adhesive dispensing system of claim 5 in which said check valve includes a closure element, a valve seat, and a spring, said closure element being biased by said spring into engagement with said seat, and said closure element being on the side of said seat opposite from said spring.

* * * * *